US 9,482,177 B2

(12) United States Patent
Yasuda

(10) Patent No.: US 9,482,177 B2
(45) Date of Patent: Nov. 1, 2016

(54) CONTROL APPARATUS FOR INTERNAL COMBUSTION ENGINE

(75) Inventor: Hiromichi Yasuda, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 357 days.

(21) Appl. No.: 13/884,193

(22) PCT Filed: Apr. 28, 2011

(86) PCT No.: PCT/JP2011/060402
§ 371 (c)(1),
(2), (4) Date: May 8, 2013

(87) PCT Pub. No.: WO2012/147193
PCT Pub. Date: Nov. 1, 2012

(65) Prior Publication Data
US 2014/0048038 A1 Feb. 20, 2014

(51) Int. Cl.
*F02D 45/00* (2006.01)
*F02D 35/02* (2006.01)
*F02D 41/22* (2006.01)

(52) U.S. Cl.
CPC ............ *F02D 45/00* (2013.01); *F02D 35/023* (2013.01); *F02D 41/222* (2013.01); *F02D 2200/1004* (2013.01); *Y02T 10/40* (2013.01)

(58) Field of Classification Search
CPC .... F02D 35/023; F02D 41/222; F02D 41/22; F02D 19/025; F02D 19/0623; Y02T 10/40
USPC ....... 701/102, 103, 104, 105, 106, 107, 108, 701/109, 110, 111, 112, 113, 114, 115
See application file for complete search history.

(56) References Cited

U.S. PATENT DOCUMENTS 4,744,244 A * 5/1988 Tanaka .................. F02D 35/023
73/1.62
5,554,801 A * 9/1996 Watanabe ............. F02D 35/023
73/1.66

(Continued)

FOREIGN PATENT DOCUMENTS

JP 07-310585 A 11/1995
JP 07-318458 A 12/1995

(Continued)

OTHER PUBLICATIONS

International Search Report for PCT/JP2011/060402 dated Jun. 7, 2011.

*Primary Examiner* — Sizo Vilakazi
(74) *Attorney, Agent, or Firm* — Sughrue Mion, PLLC

(57) ABSTRACT

An object of this invention is to accurately detect a sensitivity abnormality of an in-cylinder pressure sensor over a wide operating range without using other sensor outputs or the like. Based on only the output of an in-cylinder pressure sensor 44, an ECU 50 acquires a first parameter that is affected by an output sensitivity of the sensor, and a second parameter that is not affected by the output sensitivity. Specifically, the ECU 50 acquires a heat release quantity $PV^\kappa$ as the first parameter, and acquires an indicated torque ratio (A2/A1) as a second parameter. The ECU 50 also calculates a determination coefficient α that is a ratio between the first and second parameters, and determines that the output sensitivity of the in-cylinder pressure sensor 44 is abnormal when the determination coefficient α deviates from an allowable range. Thus, even without utilizing another sensor output or the like in an auxiliary manner or previously preparing a large amount of data or the like, a sensitivity abnormality of the in-cylinder pressure sensor 44 can be easily detected over a wide operating range.

6 Claims, 10 Drawing Sheets

(56) References Cited

U.S. PATENT DOCUMENTS

2003/0188714 A1* 10/2003 Yamamoto ............ F02D 35/023 73/114.09
2005/0229903 A1* 10/2005 Kobayashi ............ F02D 35/023 123/435
2010/0049422 A1* 2/2010 Moriya ................. F02D 35/023 701/103

FOREIGN PATENT DOCUMENTS

| JP | 07-332152 A | 12/1995 |
| JP | 2005-248703 A | 9/2005 |
| JP | 2010-127102 A | 6/2010 |
| JP | 2010-133329 A | 6/2010 |
| WO | 2008146108 A1 | 12/2008 |

* cited by examiner

CONTROL APPARATUS FOR INTERNAL COMBUSTION ENGINE

CROSS REFERENCE TO RELATED APPLICATIONS

This application is a National Stage of International Application No. PCT/JP2011/060402 filed Apr. 28, 2011, the contents of which are incorporated herein by reference in their entirety.

TECHNICAL FIELD

The present invention relates to a control apparatus for an internal combustion engine, and more particularly to a control apparatus for an internal combustion engine that is equipped with a function for determining a failure of an in-cylinder pressure sensor.

BACKGROUND ART

Conventional technology relating to the present invention includes a control apparatus for an internal combustion engine that is equipped with a function for determining a failure of an in-cylinder pressure sensor, as disclosed, for example, in Patent Literature 1 (Japanese Patent Laid-Open No. 7-310585). According to the conventional technology, an in-cylinder pressure integrated value is calculated by integrating in-cylinder pressures detected by an in-cylinder pressure sensor in a predetermined integration interval. Further, a reference value is calculated that corresponds to an in-cylinder pressure integrated value in a normal combustion state on the basis of a basic fuel injection quantity, and a failure of the in-cylinder pressure sensor is determined by comparing the reference value and the aforementioned in-cylinder pressure integrated value.

The applicants are aware of the following literature, which includes the above described literature, as literature related to the present invention.

CITATION LIST

Patent Literature

Patent Literature 1: Japanese Patent Laid-Open No. 7-310585
Patent Literature 2: Japanese Patent Laid-Open No. 7-332152
Patent Literature 3: Japanese Patent Laid-Open No. 7-318458
Patent Literature 4: Japanese Patent Laid-Open No. 2010-133329
Patent Literature 5: Japanese Patent Laid-Open No. 2010-127102
Patent Literature 6: Japanese Patent Laid-Open No. 2005-248703

SUMMARY OF INVENTION

Technical Problem

According to the above described conventional technology it is necessary to previously prepare data (a data map or the like) for setting a reference value based on a basic fuel injection quantity. Consequently, there is the problem that an operating range in which fault determination is possible is restricted in accordance with an operating range that is set in the data map. In this respect, if it is attempted to execute fault determination with respect to all operating ranges, it is necessary to perform operations to determine reference values that are respectively adapted to a large number of base fuel injection quantities that correspond to all operating ranges, and consequently the man-hours required for data adaptation increase.

On the other hand, in a method that determines a fault by making a comparison with a reference value, it is difficult to distinguish between an environmental change of the engine (for example, a change in a compression ratio that arises due to accumulation of deposits) and a fault of the in-cylinder pressure sensor. Further, there are large variations in integrated values or maximum values (Pmax) or the like of the in-cylinder pressure for each combustion event, and there is a tendency for these values to change even when the operating states are the same. However, when a margin is added to the criterion for determining a fault in consideration of these points, it will lead to a drop in the determination accuracy.

The present invention has been conceived to solve the above described problems, and an object of the present invention is to provide a control apparatus for an internal combustion engine that is capable of accurately detecting a fault of an in-cylinder pressure sensor over a wide operating range without previously preparing a large amount of data or the like.

Means for Solving the Problem

A first aspect of the present invention is a control apparatus for an internal combustion engine, comprising:

an in-cylinder pressure sensor that outputs a signal corresponding to an in-cylinder pressure of the internal combustion engine;

first parameter acquisition means that acquires a first parameter which is acquired based on an output of the in-cylinder pressure sensor and which is affected by an output sensitivity of the sensor;

second parameter acquisition means that acquires a second parameter which has a correlation with the first parameter and which is not affected by the output sensitivity, and that calculates two indicators based on in-cylinder pressures obtained at different crank angles in an identical cycle and calculates the second parameter based on a ratio between the indicators; and abnormality detection means that detects an abnormality of the output sensitivity of the in-cylinder pressure sensor based on a relationship between the first parameter and the second parameter.

In a second aspect of the present invention, further comprising:

indicated torque calculation means that, by integrating multiplication values obtained by multiplying an amount of change in an in-cylinder volume per unit crank angle by an in-cylinder pressure in a predetermined crank angle range, calculates an indicated torque corresponding to the crank angle range;

wherein:

the first parameter acquisition means acquires a heat release quantity $PV^\kappa$ that is calculated based on an in-cylinder pressure, an in-cylinder volume, and a ratio of specific heat as the first parameter; and the second parameter acquisition means acquires a ratio between an indicated torque A1 that is calculated in a crank angle range corresponding to a compression stroke and an indicated torque A2 that is calculated in a crank angle range corresponding to an expansion stroke as the second parameter.

In a third aspect of the present invention, further comprising:

determination criterion setting means that sets a determination criterion that a relationship between the first parameter and the second parameter should satisfy when the output sensitivity of the in-cylinder pressure sensor is normal; and determination criterion correction means that corrects the determination criterion based on a deviation between a combustion center of gravity calculated in a cycle in which abnormality detection of the output sensitivity is performed and a reference combustion center of gravity that is previously set.

In a fourth aspect of the present invention, further comprising:

maximum internal energy calculation means that calculates a PV value by multiplying an in-cylinder pressure at an arbitrary crank angle by an in-cylinder volume at the crank angle, and acquires a maximum value of the PV value during one cycle as a maximum internal energy PVmax; and reference internal energy calculation means that acquires a crank angle that is symmetrical about a top dead center position with a crank angle at which the maximum internal energy PVmax is obtained, and calculates the PV value at the crank angle as a reference internal energy PV0;

wherein:

the first parameter acquisition means acquires an internal energy maximum change amount ΔPVmax that is obtained by subtracting the reference internal energy PV0 from the maximum internal energy PVmax as the first parameter; and the second parameter acquisition means acquires a ratio (ΔPVmax/PV0) between the internal energy maximum change amount ΔPVmax and the reference internal energy PV0 as the second parameter.

A fifth aspect of the present invention is a control apparatus for an internal combustion engine, further comprising:

indicated torque calculation means that, by integrating multiplication values obtained by multiplying an amount of change in an in-cylinder volume per unit crank angle by an in-cylinder pressure in a predetermined crank angle range, calculates an indicated torque corresponding to the crank angle range;

maximum internal energy calculation means that calculates a PV value by multiplying an in-cylinder pressure at an arbitrary crank angle by an in-cylinder volume at the crank angle, and acquires a maximum value of the PV value during one cycle as a maximum internal energy PVmax; and reference internal energy calculation means that acquires a crank angle that is symmetrical about a top dead center position with a crank angle at which the maximum internal energy PVmax is obtained, and calculates the PV value at the crank angle as a reference internal energy PV0;

wherein:

the first parameter acquisition means acquires an internal energy maximum change amount ΔPVmax that is obtained by subtracting the reference internal energy PV0 from the maximum internal energy PVmax as the first parameter; and the second parameter acquisition means acquires a ratio (A2/A1) between an indicated torque A1 that is calculated in a crank angle range corresponding to a compression stroke and an indicated torque A2 that is calculated in a crank angle range corresponding to an expansion stroke as the second parameter.

In a sixth aspect of the present invention, further comprising:

MFB calculation means that calculates a heat release quantity $PV^\kappa$ based on an in-cylinder pressure, an in-cylinder volume, and a ratio of specific heat, and calculates a mass fraction of burned fuel at an arbitrary crank angle based on a ratio between a heat release quantity $PV^\kappa$ (θs) at a combustion start crank angle θs and a heat release quantity $PV^\kappa$ (θe) at a combustion end crank angle θe;

wherein:

the first parameter acquisition means acquires a maximum in-cylinder pressure Pmax during one cycle as the first parameter; and the second parameter acquisition means acquires a crank angle $\theta_{SMFB}$ at which the mass fraction of burned fuel matches a predetermined reference value SMFB as the second parameter.

Advantageous Effects of Invention

According to the first invention, based on only the output of the in-cylinder pressure sensor, it is possible to acquire a first parameter that is affected by the output sensitivity of the sensor, and a second parameter that is not affected by the output sensitivity. Thus, when an abnormality occurs in the output sensitivity of the in-cylinder pressure sensor, the relationship between the first parameter and the second parameter deviates from a normal state, and hence the abnormality of the output sensitivity can be reliably detected. Therefore, since another sensor output or the like need not be utilized in an auxiliary manner, the system can be simplified. Further, abnormality detection can be accurately performed without being affected by an output error of another sensor or the like. Furthermore, without previously preparing a large amount of data or the like, a sensitivity abnormality of the in-cylinder pressure sensor can be easily detected over a wide operating range, and the amount of data that is necessary for abnormality detection and the man-hours required for data adaptation can be suppressed.

According to the second invention, a heat release quantity $PV^\kappa$ that is a first parameter and a ratio between indicated torques A1 and A2 that is a second parameter can be calculated. Since the ratio between indicated torques A1 and A2 is not affected by the output sensitivity of the in-cylinder pressure sensor, an abnormality in the output sensitivity can be reliably detected based on the relationship between the first parameter and the second parameter.

According to the third invention, even if a deviation arises in the value of the heat release quantity $PV^\kappa$ due to a change in the combustion center of gravity, the determination criterion correction means can correct the determination criterion in accordance with the deviation. Therefore, even if the combustion center of gravity is changed by ignition timing control or the like, an abnormality in the sensitivity of the in-cylinder pressure sensor can be detected with high accuracy.

According to the fourth invention, an abnormality in the output sensitivity can be detected based on the relationship between an internal energy maximum change amount ΔPVmax that is a first parameter and an internal energy ratio (ΔPVmax/PV0) that is a second parameter. Since the internal energy maximum change amount ΔPVmax is the amount of change in the internal energy that is generated by combustion, it can absorb a variation in the heat release quantity caused by changes in the combustion center of gravity and the like. Therefore, even if the combustion center of gravity changes, an abnormality in the sensitivity of the in-cylinder pressure sensor can be accurately detected. Further, the internal energy maximum change amount ΔPVmax can be acquired at a crank angle that is further to the spark advance side than a combustion end crank angle. Accordingly, a sensitivity abnormality can be detected at a timing at which the detection operation is less apt to be affected by a thermal strain error that arises in the in-cylinder pressure sensor, and thus the detection accuracy can be improved.

According to the fifth invention, an abnormality in the output sensitivity can be detected based on the relationship between the internal energy maximum change amount ΔPVmax as a first parameter and the ratio between indicated torques A1 and A2 as a second parameter.

According to the sixth invention, an abnormality in the output sensitivity can be detected based on the relationship between the maximum in-cylinder pressure Pmax that is a first parameter, and a crank angle $\theta_{SMFB}$ at which the mass fraction of burned fuel becomes a predetermined reference value SMFB that is a second parameter. Therefore, the crank angle $\theta_{SMFB}$ can be calculated at a timing that is further to the spark advance side than the actual combustion end point, that is, at a timing before a thermal strain error starts to arise. Similarly, since the maximum in-cylinder pressure Pmax also occurs at a timing that is further to the spark advance side than the actual combustion end point, the maximum in-cylinder pressure Pmax is less apt to be affected by a thermal strain error. Further, since the crank angle $\theta_{SMFB}$ at which the mass fraction of burned fuel becomes a predetermined reference value SMFB is used as the second parameter, even if the combustion center of gravity changes due to ignition timing control or the like, the second parameter is not affected by such a change. Accordingly, the output sensitivity of the in-cylinder pressure sensor can be accurately detected.

DESCRIPTION OF EMBODIMENTS

Embodiment 1
[Configuration of Embodiment 1]

Figure 1:
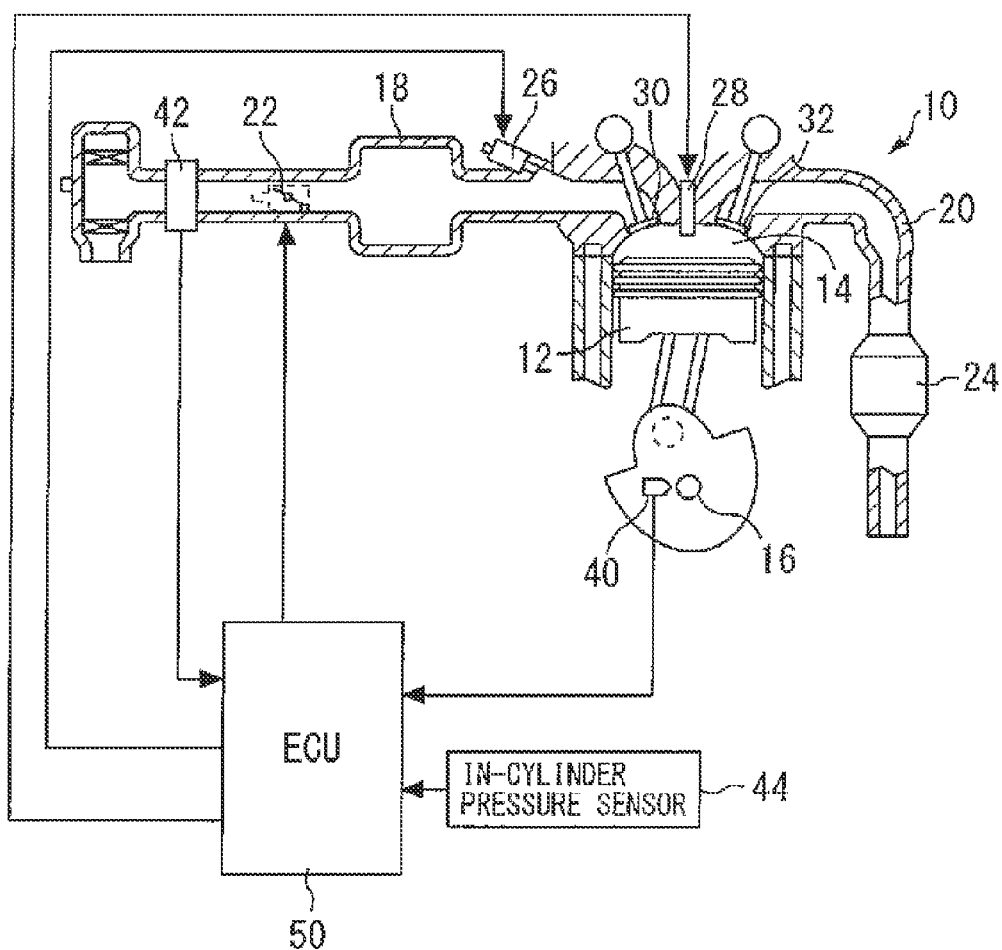
FIG. 1 is a configuration diagram for explaining the system configuration of Embodiment 1 of the present invention.

Hereunder, Embodiment 1 of the present invention is described while referring to FIGS. 1 to 6. FIG. 1 is a configuration diagram for explaining the system configuration of Embodiment 1 of the present invention. The system of the present embodiment includes an engine 10 as a multi-cylinder internal combustion engine. Although only one cylinder of the engine 10 is shown in FIG. 1, the present invention may be applied to an engine with an arbitrary number of cylinders including an engine with a single cylinder. In each cylinder of the engine 10, a combustion chamber 14 is defined by a piston 12, and the piston 12 is connected to a crankshaft 16 of the engine.

The engine 10 also includes an intake passage 18 that draws intake air into the combustion chamber 14 (inside the cylinder) of each cylinder, and an exhaust passage 20 through which exhaust gas is discharged from each cylinder. An electronically controlled throttle valve 22 that adjusts an intake air amount based on a degree of accelerator opening or the like is provided in the intake passage 18. A catalyst 24 that purifies exhaust gas is provided in the exhaust passage 20. Each cylinder is provided with a fuel injection valve 26 that injects fuel into an intake port, a spark plug 28 that ignites an air-fuel mixture in the cylinder, an intake valve 30 that opens and closes the intake port with respect to the inside of the cylinder, and an exhaust valve 32 that opens and closes an exhaust port with respect to the inside of the cylinder.

The system of the present embodiment also includes a sensor system including sensors 40 to 44, and an ECU (Electronic Control Unit) 50 that controls an operating state of the engine 10. A crank angle sensor 40 outputs a signal that is synchronous with rotation of a crankshaft 16. An airflow sensor 42 detects an intake air amount. Further, an in-cylinder pressure sensor 44 is constituted, for example, by a known pressure sensor that has a piezoelectric element or the like, and detects a signal corresponding to an in-cylinder pressure. One in-cylinder pressure sensor 44 is provided in each cylinder. The sensor system also includes various sensors that are required for engine control (a throttle sensor that detects the degree of opening of the throttle valve 22, a water temperature sensor that detects the temperature of engine cooling water, an air-fuel ratio sensor that detects the exhaust air-fuel ratio, and the like).

The ECU 50 is constituted by, for example, an arithmetic processing apparatus that is equipped with a storage circuit including a ROM, a RAM, a non-volatile memory, or the like. Each sensor of the sensor system is connected to an input side of the ECU 50. Various actuators including the throttle valve 22, the fuel injection valve 26, and the spark plug 28 are connected to an output side of the ECU 50. The ECU 50 is equipped with a function that stores various kinds of data that change according to the crank angle as time-series data together with the relevant crank angle. This time-series data includes an output value of the in-cylinder pressure sensor 44 and various parameters that are calculated based on the relevant output value and the like.

The ECU 50 controls the operating state of the engine by driving each actuator while detecting engine operating information by means of the sensor system. More specifically, the ECU 50 detects the number of engine revolutions and the crank angle based on the output of the crank angle sensor 40, and calculates an intake air amount based on the output of the airflow sensor 42. The ECU 50 also calculates the engine load (load factor) based on the intake air amount and the number of engine revolutions and the like. The ECU 50 determines the fuel injection timing and the ignition timing based on the crank angle, and drives the fuel injection valve 26 or the spark plug 28 when these timings are reached. Thus, an air-fuel mixture inside the cylinders can be burned to operate the engine. The ECU 50 also executes known combustion control and detects knocking or pre-ignition and the like based on the output of the in-cylinder pressure sensor 44.

[Features of Embodiment 1]

A feature of the present embodiment is that an abnormality in the output sensitivity of the in-cylinder pressure sensor 44 is detected based on the output of the sensor. In this case, with respect to abnormality detection methods according to the conventional technology, as a first example of the conventional technology, a method is known that detects an abnormality in the output sensitivity of an in-cylinder pressure sensor based on outputs of other sensors such as an intake air pressure sensor, an airflow sensor, and an A/F sensor. Further, as a second example of the conventional technology, a method is known that detects an abnormality in the output sensitivity of an in-cylinder pressure sensor by previously storing a normal output of the in-cylinder pressure sensor under specific operating conditions as a reference value, and detecting the existence of an abnormality based on the reference value.

However, according to the first example of the conventional technology, because the accuracy of detecting an abnormality depends on the accuracy of the sensors that serve as a reference, abnormality detection cannot be performed when there is a fault at a sensor that serves as a reference. Further, according to the second detection method, it is necessary to either limit an operating condition (operating range) under which to perform abnormality detection or to perform operations to adapt a reference value to all operating ranges, and therefore either the opportunities to carry out abnormality detection are limited or the man-hours required for adaptation of the reference value increase. Further, since there are variations in reference values even under the same operating conditions, the accuracy of detecting an abnormality decreases.

Therefore, according to the present embodiment two kinds of parameters (first and second parameters) with mutually different characteristics are acquired on the basis of the output of the in-cylinder pressure sensor 44, and an abnormality in the output sensitivity of the in-cylinder pressure sensor is detected based on the relationship between these parameters. In this case, although the first and second parameters have a fixed correlation with each other, the first parameter has a characteristic that is affected by the output sensitivity of the in-cylinder pressure sensor, and the second parameter has a characteristic that is not affected by the output sensitivity. Accordingly, since the relationship between the two parameters changes from a state at a normal time if an abnormality arises in the output sensitivity, the abnormality in the output sensitivity can be detected based on only the output of the in-cylinder pressure sensor. In this connection, the first and second parameters are acquired in the same cycle.

According to the present embodiment, a heat release quantity $PV^\kappa$ is acquired as the first parameter and an indicated torque ratio (A2/A1) is acquired as the second parameter. When a determination coefficient $\alpha$ that is a ratio between the first and second parameters deviates from an allowable range, it is determined that the output sensitivity is abnormal. These processes are described specifically hereunder.

(First Parameter)

Figure 2:
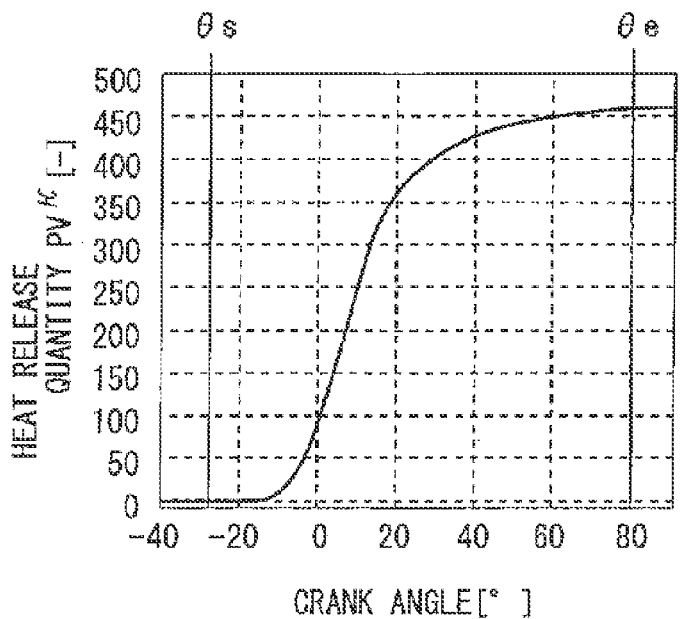
FIG. 2 is a characteristics diagram that illustrates the relationship between the heat release quantity $PV^\kappa$ that is the first parameter and the crank angle.

FIG. 2 is a characteristics diagram that illustrates the relationship between the heat release quantity $PV^\kappa$ that is the first parameter and the crank angle. In FIG. 2, $\theta s$ denotes a combustion start crank angle and $\theta e$ denotes a combustion end crank angle. Although the combustion start crank angle $\theta s$ is a crank angle immediately after ignition, the combustion start crank angle $\theta s$ may be set as a crank angle before ignition for calculation purposes. The combustion end crank angle $\theta e$ is set to a crank angle at which combustion normally ends (for example, approximately ATDC 80°). Note that, in the following description, it is assumed that a crank angle of 0° (°CA) corresponds to top dead center (TDC).

Since the heat release quantity $PV^\kappa$ corresponds to a heat quantity generated in a cylinder, as shown in FIG. 2, the heat release quantity $PV^\kappa$ increases in the direction of the combustion end crank angle $\theta e$ from the combustion start crank angle $\theta s$, and reaches a maximum in the vicinity of the combustion end crank angle $\theta e$. The heat release quantity $PV^\kappa$ is calculated by multiplying an in-cylinder pressure P detected by the in-cylinder pressure sensor 44 at an arbitrary crank angle by a value $V^\kappa$ obtained by exponentiating an in-cylinder volume V at the relevant crank angle by a ratio of specific heat $\kappa$. Accordingly, since the heat release quantity $PV^\kappa$ includes an absolute value of the in-cylinder pressure P as it is, the heat release quantity $PV^\kappa$ is a parameter that is affected by the output sensitivity of the in-cylinder pressure sensor, and fluctuates in accordance with an error in the output sensitivity.

Further, an offset component that changes in accordance with the amount of air inside the cylinder and the like is included in the value calculated for the heat release quantity $PV^\kappa$. Therefore, the heat release quantity $PV^\kappa$ that is used as the first parameter is calculated in a state in which an offset that would constitute an error has been removed by subtracting the heat release quantity $PV^\kappa$ at the combustion start crank angle $\theta s$ from the heat release quantity $PV^\kappa$ at the combustion end crank angle $\theta e$. FIG. 2 shows heat release quantities $PV^\kappa$ in a state in which an offset component has been removed.

(Second Parameter)

Figure 3:
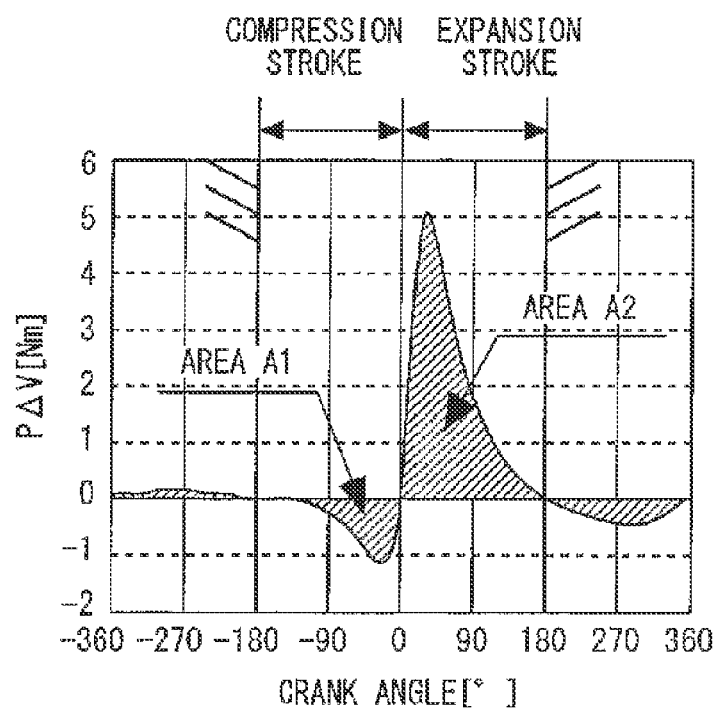
FIG. 3 is a characteristics diagram that illustrates indicated torques before and after combustion that are used to calculate the indicated torque ratio (A2/A1).

Next, the indicated torque ratio (A2/A1) that is the second parameter is described. FIG. 3 is a characteristics diagram that illustrates indicated torques before and after combustion that are used to calculate the indicated torque ratio (A2/A1). According to the present embodiment, an indicated torque A1 in a compression stroke and an indicated torque A2 in an expansion stroke are calculated as the indicated torques before and after combustion, respectively. As shown in FIG. 3, the indicated torque A1 (area A1) in the compression stroke is calculated by integrating multiplication values (PΔV) obtained by multiplying a variation ΔV in the in-cylinder volume per unit crank angle by the in-cylinder pressure P with respect to a crank angle range (−180° to 0°) corresponding to the compression stroke. The indicated torque A2 (area A2) in the expansion stroke is calculated by integrating the multiplication values PΔV with respect to a crank angle range corresponding to the expansion stroke (0° to 180°).

The indicated torque ratio (A2/A1) is calculated as a ratio of the indicated torque A2 in the expansion stroke to the indicated torque A1 in the compression stroke. More specifically, according to the present embodiment, two indicators A1 and A2 are calculated based on in-cylinder pressures P and the like that are obtained at different crank angles (−180° to 0°) and (0° to 180°) in the same cycle, and an indicated torque ratio (A2/A1) is calculated based on the ratio between the indicators. Since the indicated torque ratio (A2/A1) obtained in this manner includes the in-cylinder pressure P in the denominator and the numerator thereof, respectively, a change in the output sensitivity of the in-cylinder pressure sensor is cancelled out between the denominator and the numerator, and thus the parameter is one that is not affected by the output sensitivity. In this connection, the in-cylinder volumes V at arbitrary crank angles and the variations ΔV per unit crank angle thereof are previously stored as a data map or the like in the ECU 50.

(Sensitivity Abnormality Detection Processing)

Figure 4:
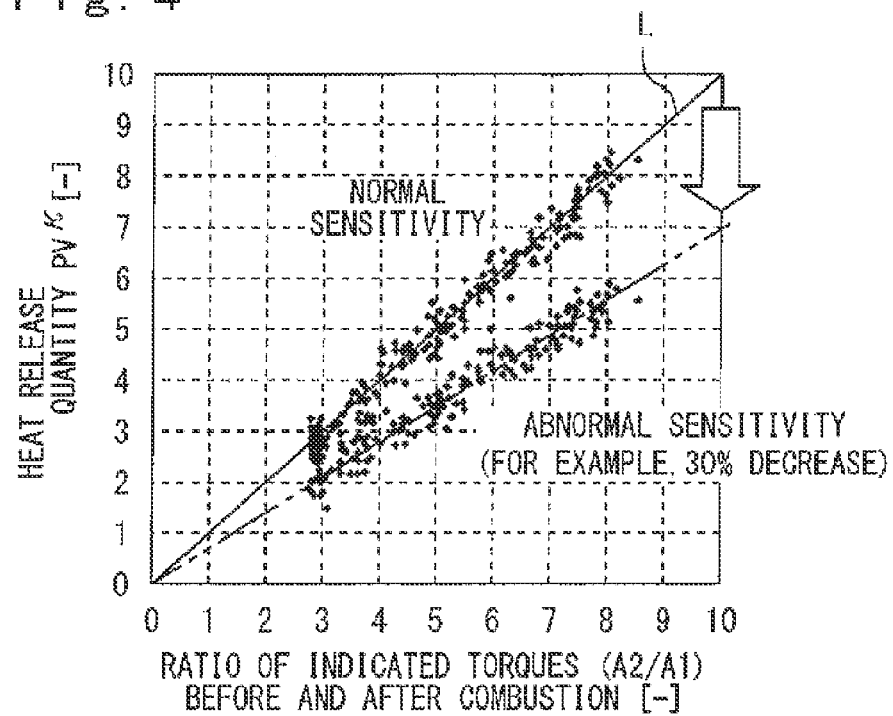
FIG. 4 is a characteristics diagram that shows the relationship between the heat release quantity $PV^\kappa$ and the indicated torque ratio (A2/A1).
Figure 5:
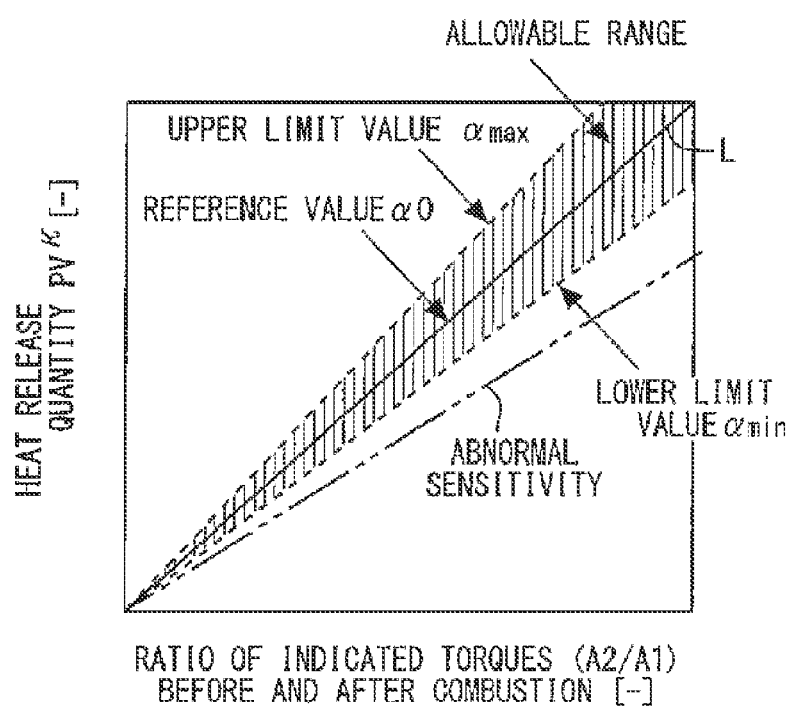
FIG. 5 is an explanatory view that illustrates an allowable range of the determination coefficient α in the form of slopes of characteristic lines.

Next, processing that detects an abnormality in the output sensitivity based on the first and second parameters is described while referring to FIG. 4 and FIG. 5. FIG. 4 is a characteristics diagram that shows the relationship between the heat release quantity $PV^\kappa$ and the indicated torque ratio (A2/A1). In general, since that is a correlation between a heat release quantity inside a cylinder and the generated amount of torque, for example, a proportionality relationship as shown by a characteristic line L in FIG. 4 holds between the heat release quantity $PV^\kappa$ and the ratio of indicated torques (A2/A1) before and after combustion. In this case, it is assumed that the characteristic line L is a characteristic line (reference characteristic line) in a case where the output sensitivity of the in-cylinder pressure sensor matches the design value. When a deviation does not arise in the output sensitivity, under an arbitrary operating condition a ratio between the heat release quantity $PV^\kappa$ and the indicated torque ratio (A2/A1) is a value that corresponds to the slope of the reference characteristic line L.

In contrast, a hypothetical line in FIG. 4 shows a characteristic line that is obtained when the output sensitivity of the sensor deviates from the design value (for example, in the case of a 30% decrease). When a deviation arises in the output sensitivity of the sensor, although the value of the heat release quantity $PV^\kappa$ is affected by the deviation and fluctuates, the value of the indicated torque ratio (A2/A1) is not affected by the deviation, and hence the ratio between the two values (slope of the characteristic line) changes.

Therefore, according to the present embodiment, as shown in the following equation (1), the ratio between the heat release quantity $PV^\kappa$ and the indicated torque ratio (A2/A1) is calculated as a determination coefficient α, and when the determination coefficient α deviates from a predetermined allowable range, the output sensitivity of the in-cylinder pressure sensor is determined to be abnormal.

$$\alpha = PV^\kappa / (A2/A1) \tag{1}$$

FIG. 5 is an explanatory view that illustrates an allowable range of the determination coefficient α in the form of slopes of characteristic lines. The allowable range of the determination coefficient α corresponds to a range of output sensitivities of the in-cylinder pressure sensor that are practically allowable, and constitutes a determination criterion that the determination coefficient α should satisfy when the output sensitivity is normal. This allowable range is set by means of an upper limit value αmax and a lower limit value αmin that are previously stored in the ECU 50. The upper limit value αmax and lower limit value αmin are, for example, set as values obtained by increasing and decreasing the slope of the reference characteristic line L (reference value α0) at a fixed rate. In the processing to detect a sensitivity abnormality, when the determination coefficient α calculated by the above equation (1) is within the allowable range, that is, when the expression αmax≥α≥αmin holds, it is determined that the output sensitivity of the in-cylinder pressure sensor is normal. Further, when the determination coefficient α deviates from the allowable range, as in the case of a characteristic line illustrated by the hypothetical line in FIG. 5 for example, it is determined that the output sensitivity of the sensor is abnormal.

[Specific Processing to Realize Embodiment 1]

Figure 6:
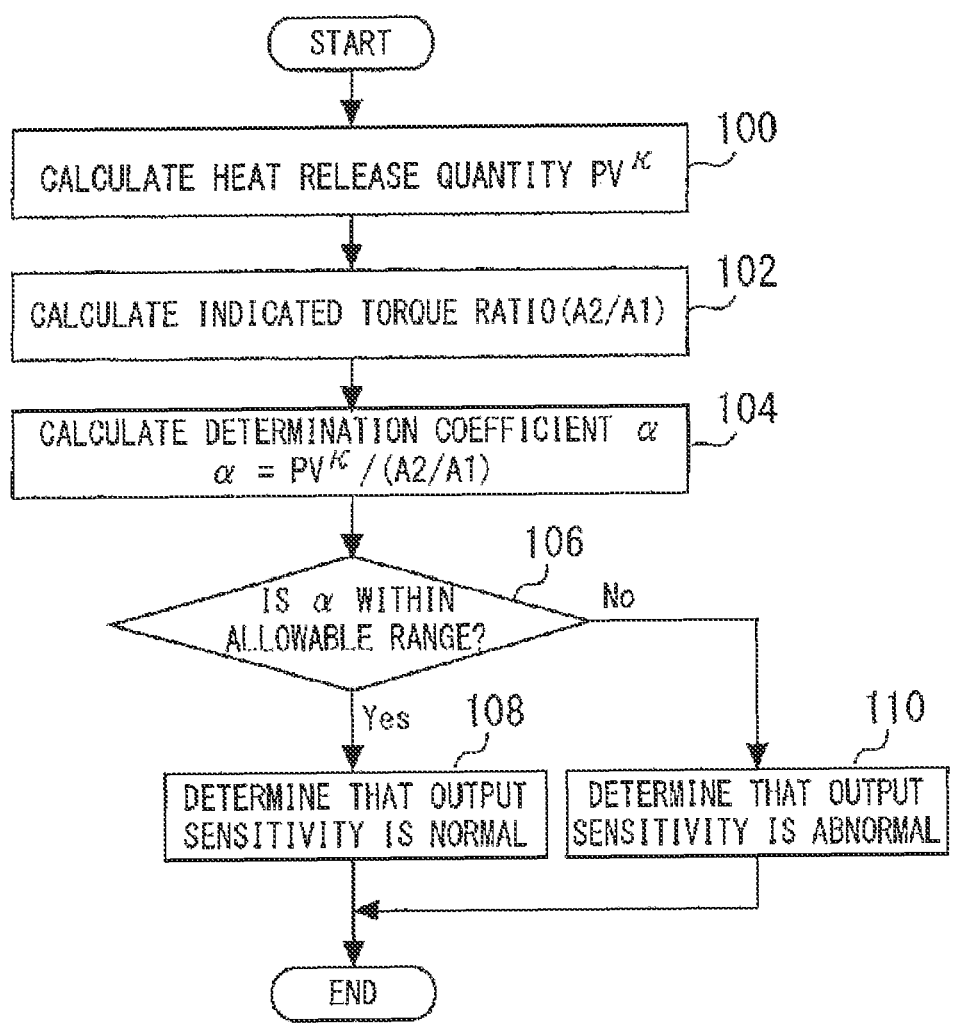
FIG. 6 is a flowchart that illustrates control executed by the ECU according to Embodiment 1 of the present invention.

Next, specific processing for implementing the above described control is described with reference to FIG. 6. FIG. 6 is a flowchart that illustrates control executed by the ECU according to Embodiment 1 of the present invention. It is assumed that the routine shown in FIG. 6 is repeatedly executed during operation of the engine. According to the routine shown in FIG. 6, first, in step 100, for example, a heat release quantity $PV^\kappa$ from which an offset component is removed is calculated by subtracting a heat release quantity $PV^\kappa$ at the combustion start crank angle θs from a heat release quantity $PV^\kappa$ at the combustion end crank angle θe.

Next, in step 102, the indicated torque A1 in the compression stroke and the indicated torque A2 in the expansion stroke are calculated, and are used to calculate the indicated torque ratio (A2/A1). In this connection, in the calculation processing of steps 100 and 102, the heat release quantity $PV^\kappa$ is calculated when the crank angle reaches the combustion end crank angle θe, and the indicated torque ratio (A2/A1) is calculated by integration processing over a single cycle. These calculation processes may also be executed, for example, after the end of the expansion stroke, based on time-series data for the in-cylinder pressure or the like that is stored in the ECU 50.

Next, in step 104, the determination coefficient α is calculated by the aforementioned equation (1), and in step 106 the ECU 50 determines whether or not the determination coefficient α falls within the allowable range. If the result determined in step 106 is affirmative, that is, when the expression αmax≥α≥αmin holds, in step 108 the ECU 50 determines that the output sensitivity of the in-cylinder pressure sensor is normal. In contrast, if the result determined in step 106 is negative, in step 110, the ECU 50 determines that the output sensitivity is abnormal.

As described above, according to the present embodiment, based on the output of the in-cylinder pressure sensor 44, the heat release quantity $PV^\kappa$ that is affected by the output sensitivity of the sensor, and the indicated torque ratio (A2/A1) that is not affected by the output sensitivity are calculated, and an abnormality in the output sensitivity can be detected based on the determination coefficient α that is a ratio between the two calculated values. Therefore, since another sensor output or the like need not be utilized in an auxiliary manner, a sensitivity abnormality can be detected based on only the output of the in-cylinder pressure sensor, and thus the system can be simplified. Further, abnormality detection can be accurately performed without being affected by an output error of another sensor or the like.

In addition, since the determination coefficient α can be calculated under an arbitrary operating condition (operating range), even without previously preparing a large amount of data or the like, a sensitivity abnormality of the in-cylinder pressure sensor can be easily detected over a wide operating range. Accordingly, the amount of data required for abnormality detection or the man-hours required for data adaptation can be suppressed. Further, since maximum values of in-cylinder pressure or the like in which variations are liable to arise during each combustion are not used, a margin added to the criterion for determining a sensitivity abnormality (allowable range of the determination coefficient α) can be set to a minimum amount, and the determination accuracy can be improved.

Note that, in the above described Embodiment 1, step 100 in FIG. 6 shows a specific example of first parameter acquisition means according to claims 1 and 2 and step 102 shows a specific example of second parameter acquisition means. Further, steps 104, 106, 108, and 110 show a specific example of abnormality detection means. Furthermore, the characteristics diagram shown in FIG. 3 shows a specific example of indicated torque calculation means according to claim 2, and the characteristics diagram shown in FIG. 5 constitutes a specific example of determination criterion setting means according to claim 3.

Embodiment 2

Next, Embodiment 2 of the present invention is described with reference to FIG. 7 and FIG. 8. A feature according to the present embodiment is that, with respect to the same configuration and control as the above described Embodiment 1, an allowable range of the determination coefficient α is corrected in accordance with changes in the combustion center of gravity. According to the present embodiment, components that are the same as in Embodiment 1 are denoted by the same reference symbols, and a description of such components is omitted.

[Features of Embodiment 2]

In general, when the combustion center of gravity is changed as the result of ignition timing control or the like, a heat release quantity inside the cylinder also changes in accompaniment therewith. More specifically, for example, when the ignition timing is retarded, the combustion efficiency changes and afterburning of unburned fuel and the like increases, and consequently the heat release quantity increases. Therefore, if the determination coefficient α is calculated on the premise that the combustion center of gravity is constant, a case may occur in which a deviation arises in the calculated value. In FIG. 4 of Embodiment 1, the reason that variations exist in the data with respect to the reference characteristic line L is mainly because there are changes in the combustion center of gravity. Therefore, according to the present embodiment, the allowable range (upper limit value αmax and lower limit value αmin) of the determination coefficient α is corrected in accordance with changes in the combustion center of gravity.

Figure 7:
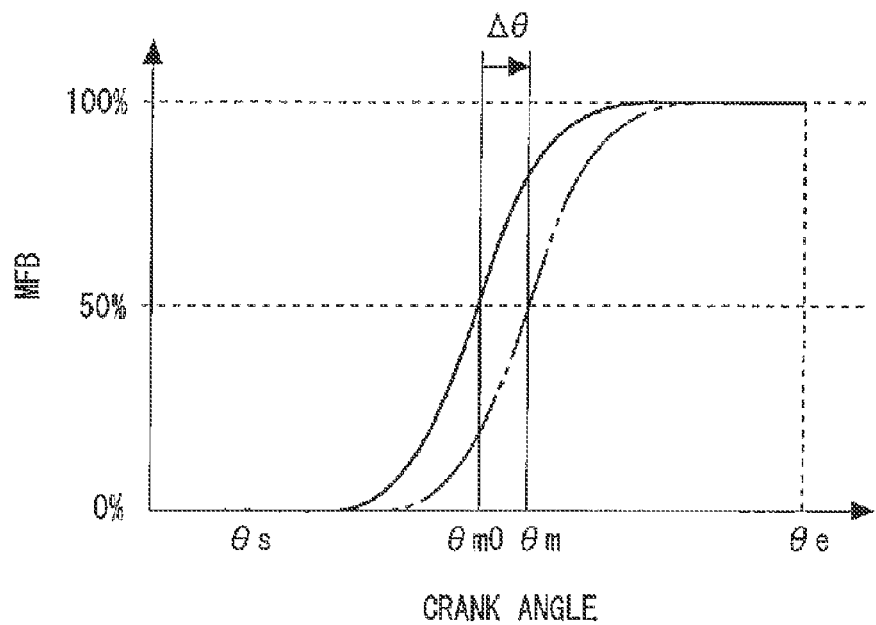
FIG. 7 is a characteristics diagram that shows changes in the combustion center of gravity that are caused by ignition timing control or the like according to Embodiment 2 of the present invention.

FIG. 7 is a characteristics diagram that shows changes in the combustion center of gravity that are caused by ignition timing control or the like according to Embodiment 2 of the present invention. A characteristic line shown in FIG. 7 represents a mass fraction of burned fuel MFB that is calculated by equation (2) below, for which the combustion center of gravity θm is defined as a crank angle θ at which the MFB=50%. In the following equation (2), $PV^\kappa(\theta)$, $PV^\kappa(\theta s)$ and $PV^\kappa(\theta e)$ denote a heat release quantity $PV^\kappa$ at a crank angle θ, the combustion start crank angle θs, and the combustion end crank angle θe, respectively.

$$MFB(\%) = \frac{PV^\kappa(\theta) - PV^\kappa(\theta e)}{PV^\kappa(\theta s) - PV^\kappa(\theta e)} \qquad (2)$$

As shown in FIG. 7, the combustion center of gravity θm changes in accordance with the ignition timing or the like. Therefore, according to the present embodiment, the combustion center of gravity θm is calculated in a cycle in which the output sensitivity of the in-cylinder pressure sensor is assessed, and a deviation Δθ between the calculated combustion center of gravity θm and a reference combustion center of gravity θm0 is calculated by the following equation (3). In this case, the reference combustion center of gravity θm0 is a value that serves as a reference when setting the allowable range of the determination coefficient α, and the upper limit value αmax and lower limit value αmin that are boundary values of the allowable range are set on the premise that the combustion center of gravity is αm0.

$$\Delta\theta = \theta m - \theta m0 \qquad (3)$$

In the subsequent processing, based on the deviation Δθ of the combustion center of gravity, a correction coefficient β of the allowable range is calculated by referring to a data map (FIG. 8), described later, that is previously stored in the ECU 50. Next, based on the calculated correction coefficient β, the upper limit value αmax and lower limit value αmin are corrected by means of the following equations (4) and (5), to thereby calculate a corrected upper limit value Δmax' and a corrected lower limit value αmin'. Subsequently, using the corrected upper limit value αmax' and corrected lower limit value αmin', the ECU 50 determines whether or not the determination coefficient α falls within the allowable range.

$$\alpha max' = \alpha max \times \beta \qquad (4)$$

$$\alpha min' = \alpha min \times \beta \qquad (5)$$

Figure 8:
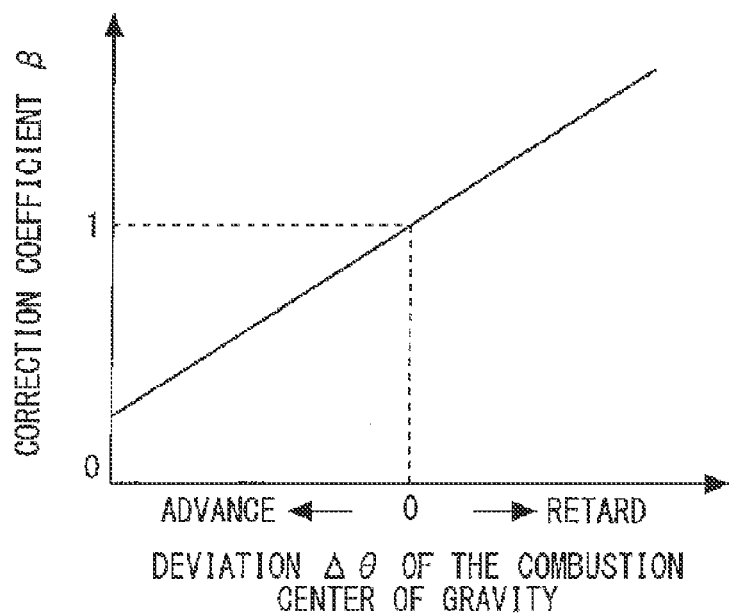
FIG. 8 is a view that illustrates a data map for calculating the correction coefficient β of the allowable range based on the deviation Δθ of the combustion center of gravity.

FIG. 8 is a view that illustrates a data map for calculating the correction coefficient β of the allowable range based on the deviation Δθ of the combustion center of gravity. As described above, the greater the degree to which the combustion center of gravity (ignition timing) is retarded, the greater the increase in the heat release quantity $PV^\kappa$, and therefore the slope of the characteristic line L shown in the above described FIG. 4 and FIG. 5 and the calculated value of the determination coefficient α also deviate in the increasing direction in accompaniment therewith. Therefore, according to the present embodiment, as shown in FIG. 8, the greater the degree to which the combustion center of gravity θm is retarded, the greater the degree to which the correction coefficient β is increased and the corrected upper limit value αmax' and lower limit value αmin' are corrected in the increasing direction.

Thus, according to the present embodiment, in addition to the same operational advantages of the foregoing Embodiment 1, it is possible to correct the allowable range in accordance with a deviation of the determination coefficient α, and to cancel out affects generated by a change in the combustion center of gravity. Therefore, even if the combustion center of gravity is changed by ignition timing control or the like, an abnormality in the output sensitivity of the in-cylinder pressure sensor 44 can be detected with high accuracy. Note that, as specific processing for implementing Embodiment 2, for example, relative to the processing of Embodiment 1 (FIG. 6), before executing the processing of step 106, the corrected upper limit value αmax' and lower limit value αmin' are calculated based on the above described processing. Subsequently, in step 106, it is sufficient to determine whether or not the expression αmax'≥α≥αmin' holds. Further, in Embodiment 2, the data map shown in FIG. 8 and the above described equations (4) and (5) show a specific example of determination criterion correction means according to claim 3.

Embodiment 3

Next, Embodiment 3 of the present invention is described with reference to FIG. 9 to FIG. 11. A feature according to the present embodiment is that parameters that are different to the parameters of the above described Embodiment 1 are used as the first and second parameters. According to the present embodiment, components that are the same as in Embodiment 1 are denoted by the same reference symbols, and a description of such components is omitted.

[Features of Embodiment 3]

Figure 9:
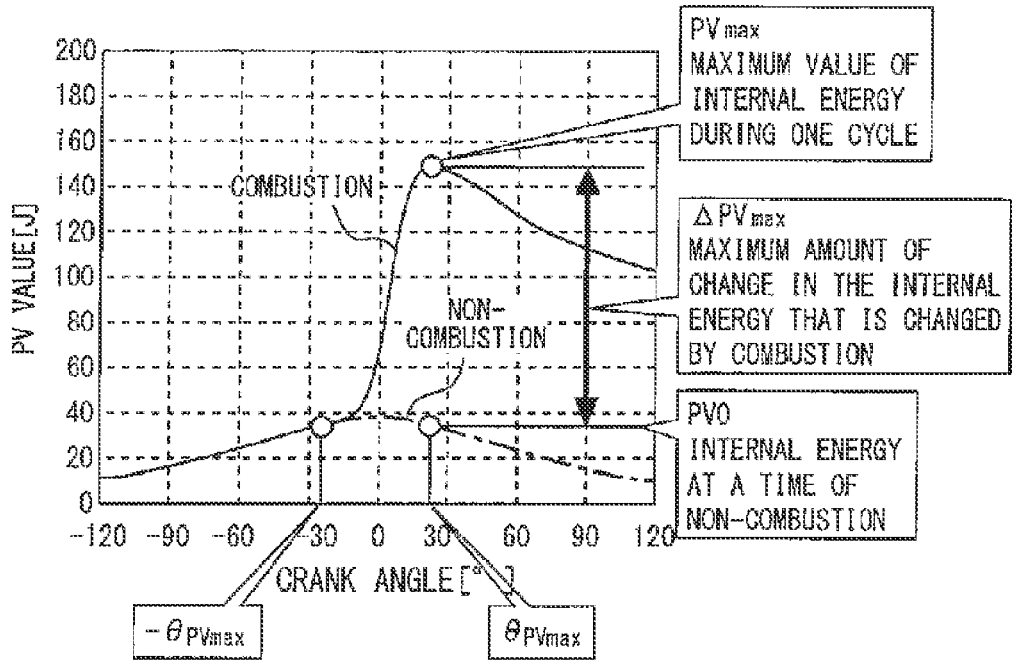
FIG. 9 is a characteristics diagram that shows changes in PV values before and after combustion, according to Embodiment 3 of the present invention.

FIG. 9 is a characteristics diagram that shows changes in PV values before and after combustion, according to Embodiment 3 of the present invention. The term "PV value" refers to a value that is obtained by multiplying an in-cylinder pressure P at an arbitrary crank angle by an in-cylinder volume V at the relevant crank angle, and that corresponds to an amount of internal energy in a cylinder. According to the present embodiment, attention is focused on the PV value to acquire first and second parameters. More specifically, an internal energy maximum change amount ΔPVmax is acquired as a first parameter and an internal energy ratio (ΔPVmax/PV0) is acquired as a second parameter. These parameters are described specifically hereunder.

(First Parameter)

As shown in FIG. 9, the PV value rapidly increases when combustion begins, and reaches a maximum at a crank angle $\theta_{PVmax}$ before combustion ends. According to the present embodiment, the maximum value of the PV value is acquired as a maximum internal energy PVmax. The maximum internal energy PVmax corresponds to the maximum value of internal energy during one cycle. The crank angle $\theta_{PVmax}$ at which the maximum internal energy PVmax is obtained is a crank angle that is further to the spark advance side than a crank angle (combustion end crank angle) at which combustion ends. As one example, when the combustion end crank angle is approximately ATDC 80°, the crank angle $\theta_{PVmax}$ is ATDC 20 to 25°.

Although the maximum internal energy PVmax is the maximum amount of internal energy in a cylinder, in addition to internal energy generated by combustion, that value also includes internal energy that relates only to compression and expansion of in-cylinder gas carried out by the piston. Therefore, in the following processing, the PV value at the crank angle $\theta_{PVmax}$ at a time of non-combustion is acquired as a reference internal energy PV0. Since the PV value at a time of non-combustion depends only on the vertical movement of the piston, as shown by a hypothetical line in FIG. 9, the PV value changes symmetrically about top dead center) (0°). By utilizing this characteristic, the reference internal energy PV0 at the crank angle $\theta_{PVmax}$ that cannot be obtained at a time of combustion can be acquired as a PV value at a crank angle $-\theta_{PVmax}$ that is symmetrical with the crank angle $\theta_{PVmax}$.

According to the present embodiment, the internal energy maximum change amount ΔPVmax as the first parameter is calculated by the following equation (6) based on a difference between the maximum internal energy PVmax and the reference internal energy PV0. Since the internal energy maximum change amount ΔPVmax calculated in this manner is the maximum amount of change in the internal energy that is changed by combustion, that is, a difference between the PV value at a time of combustion and the PV value at a time of non-combustion (difference in the internal energy), the internal energy maximum change amount ΔPVmax has a correlation with the indicated torque. Further, since the internal energy maximum change amount ΔPVmax includes an absolute value of the in-cylinder pressure P as it is, the internal energy maximum change amount ΔPVmax is a parameter that is affected by the output sensitivity of the in-cylinder pressure sensor.

$$\Delta PVmax = PVmax - PV0 \quad (6)$$

(Second Parameter)

The internal energy ratio (ΔPVmax/PV0) that is the second parameter is calculated as a ratio of the maximum internal energy PVmax to the reference internal energy PV0. More specifically, according to the present embodiment, two indicators ΔPVmax and PV0 are calculated based on the in-cylinder pressure P and the like obtained at different crank angles $\theta_{PVmax}$ and $-\theta_{PVmax}$ in the same cycle, and the internal energy ratio (ΔPVmax/PV0) is calculated based on the ratio between these indicators. Since the internal energy ratio (ΔPVmax/PV0) obtained in this manner includes the in-cylinder pressure P in the denominator and the numerator thereof, respectively, the internal energy ratio (ΔPVmax/PV0) is a parameter that is not affected by the output sensitivity of the in-cylinder pressure sensor.

(Sensitivity Abnormality Detection Processing)

Figure 10:
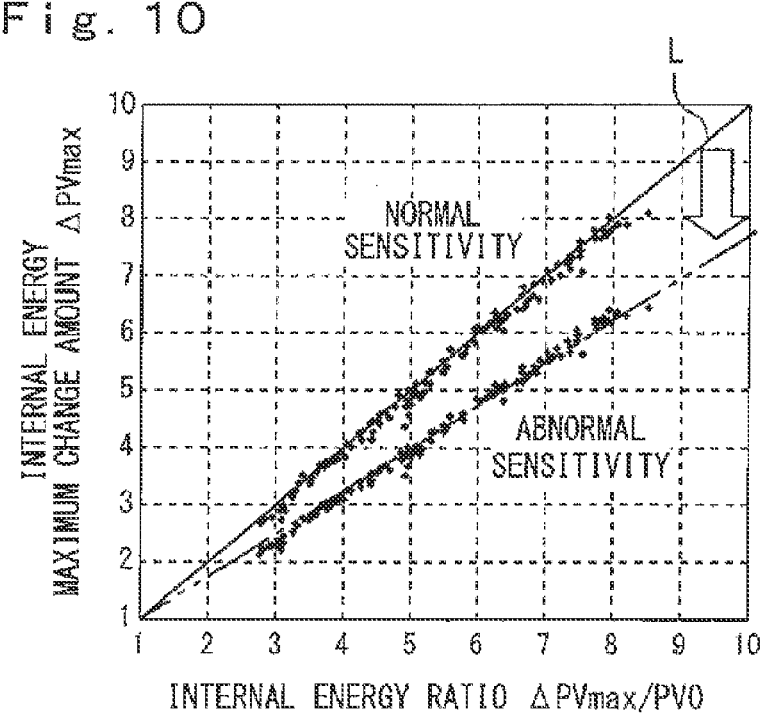
FIG. 10 is a characteristics diagram that illustrates the relationship between the internal energy maximum change amount ΔPVmax and the internal energy ratio (ΔPVmax/PV0).

Next, processing to detect a sensitivity abnormality is described referring to FIG. 10. FIG. 10 is a characteristics diagram that illustrates the relationship between the internal energy maximum change amount ΔPVmax and the internal energy ratio (ΔPVmax/PV0). As will be understood from the definition thereof, the internal energy ratio (ΔPVmax/PV0) has a proportionality relationship with the internal energy maximum change amount ΔPVmax. Therefore, processing to detect a sensitivity abnormality is performed in a similar manner to Embodiment 1 based on a determination coefficient α that is a ratio between the two values, and an allowable range (upper limit value αmax and lower limit value αmin) corresponding to the slope of a reference characteristic line L shown in FIG. 10. According to the present embodiment, the determination coefficient α is calculated by the following equation (7).

$$\alpha = \Delta PVmax/(\Delta PVmax/PV0). \quad (7)$$

[Specific Processing to Realize Embodiment 3]

Next, specific processing for implementing the above described control is described with reference to FIG. 11. FIG. 11 is a flowchart that illustrates control executed by the ECU according to Embodiment 3 of the present invention. It is assumed that the routine shown in FIG. 11 is repeatedly executed during operation of the engine. According to the routine shown in FIG. 11, first, in step 200, for example, the maximum internal energy PVmax is acquired by referring to time-series data of the PV value for one cycle that is stored in the ECU 50. Further, in step 202, the crank angle $\theta_{PVmax}$ at which the maximum internal energy PVmax is obtained is acquired, and in step 204, the crank angle $-\theta_{PVmax}$ that is symmetrical with the crank angle $\theta_{PVmax}$ about top dead center is acquired.

Next, in step 206, for example, by referring to time-series data, the ECU 50 acquires the reference internal energy PV0 based on the PV value at the crank angle $-\theta_{PVmax}$. Subsequently, in step 208, the ECU 50 calculates the internal energy maximum change amount $\Delta$PVmax by the above described equation (6), and in step 210 the ECU 50 calculates the internal energy ratio ($\Delta$PVmax/PV0). Next, in step 212, the ECU 50 calculates the determination coefficient $\alpha$ by the above described equation (7), and in step 214, the ECU 50 determines whether or not the determination coefficient $\alpha$ falls within the allowable range. If the result determined in step 214 is affirmative, that is, if the expression $\alpha max \geq \alpha \geq \alpha min$ holds, in step 216 the ECU 50 determines that the output sensitivity of the in-cylinder pressure sensor is normal. In contrast, if the result determined in step 214 is negative, in step 218 the ECU 50 determines that the output sensitivity is abnormal.

According to present embodiment configured in this manner also, the same operational advantages as in the above described Embodiment 1 can be obtained, and a sensitivity abnormality of the in-cylinder pressure sensor 44 can be detected without depending on the operating condition of the engine. In particular, because the internal energy maximum change amount $\Delta$PVmax is an amount of change in the internal energy that is generated by combustion, the internal energy maximum change amount $\Delta$PVmax can absorb a variation in the heat release quantity that is produced by a change in the combustion center of gravity and the like. Thus, even if the combustion center of gravity changes, a sensitivity abnormality of the in-cylinder pressure sensor can be accurately detected.

In addition to the above described advantage, the following advantages can also be obtained according to the present embodiment. First, an output error (thermal strain error) that is caused by thermal strain of the sensor is liable to arise in the output of the in-cylinder pressure sensor 44. Thermal strain of the sensor mainly occurs in a diaphragm that covers a piezoelectric element, and arises due to the diaphragm deforming in accordance with a difference between thermal expansion amounts on a front surface side and a rear surface side. Therefore, occurrence of a thermal strain error tends to be noticeable from immediately after the end of combustion, due to a response delay or the like caused by conduction of heat to the diaphragm. In contrast, according to the present embodiment, since the internal energy maximum change amount $\Delta$PVmax can be acquired at a crank angle $\theta_{PVmax}$ that is further to the spark advance side than the combustion end crank angle, the output sensitivity of the in-cylinder pressure sensor can be determined at a timing at which the internal energy maximum change amount $\Delta$PVmax is less apt to be affected by a thermal strain error, and thus the accuracy of detecting a sensitivity abnormality can be enhanced.

Further, low-frequency noise that is produced by injection of fuel or seating of a fuel injection valve is liable to arise in a detection value of the in-cylinder pressure at the combustion end crank angle. This kind of low-frequency noise cannot be easily removed by a low-pass filter or the like, and causes an error to arise in the heat release quantity $PV^{\kappa}$ or indicated torque A2 or the like. In this respect, according to the present embodiment, the influence of noise can be avoided for the above described reason. In addition, because the timing for acquiring the internal energy maximum change amount $\Delta$PVmax is one at which the PV value is at a maximum and the in-cylinder pressure P is high, that is, a timing at which the resolution of an in-cylinder pressure waveform is high (the signal-to-noise ratio is favorable), a sensitivity abnormality can be detected more accurately.

Figure 11:
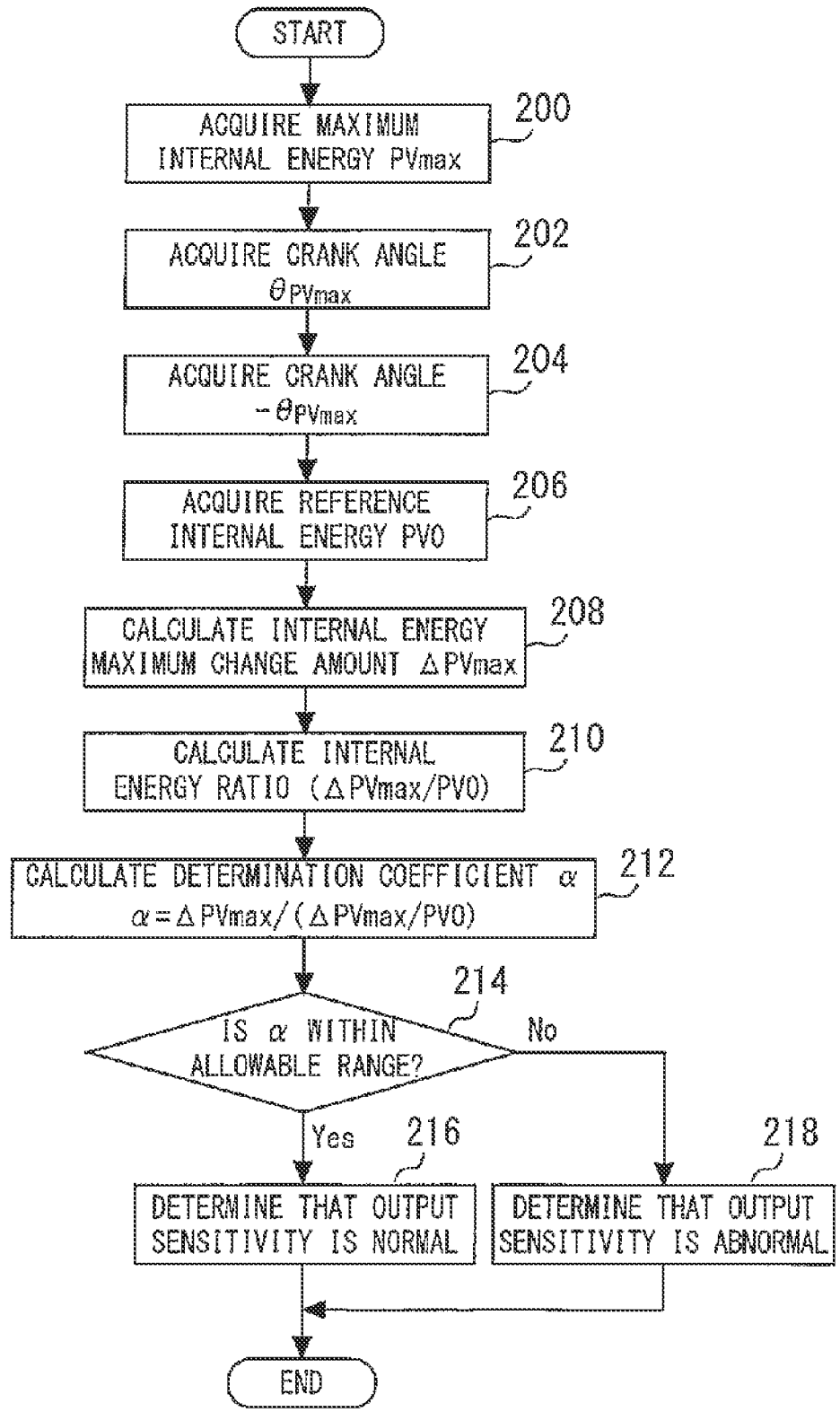
FIG. 11 is a flowchart that illustrates control executed by the ECU according to Embodiment 3 of the present invention.

Note that, in the above described Embodiment 3, steps 200 to 208 in FIG. 11 show a specific example of first parameter acquisition means according to claims 1 and 4, and step 210 shows a specific example of second parameter acquisition means. Further, steps 212, 214, 216, and 218 show a specific example of abnormality detection means. In addition, step 200 shows a specific example of maximum internal energy calculation means according to claim 4, and steps 202, 204, and 206 show a specific example of reference internal energy calculation means.

Embodiment 4

Next, Embodiment 4 of the present invention is described with reference to FIG. 12. A feature according to the present embodiment is that parameters used in the above described Embodiments 1 and 3 are combined. According to the present embodiment, components that are the same as in Embodiments 1 and 3 are denoted by the same reference symbols, and a description of such components is omitted.

[Features of Embodiment 4]

Figure 12:
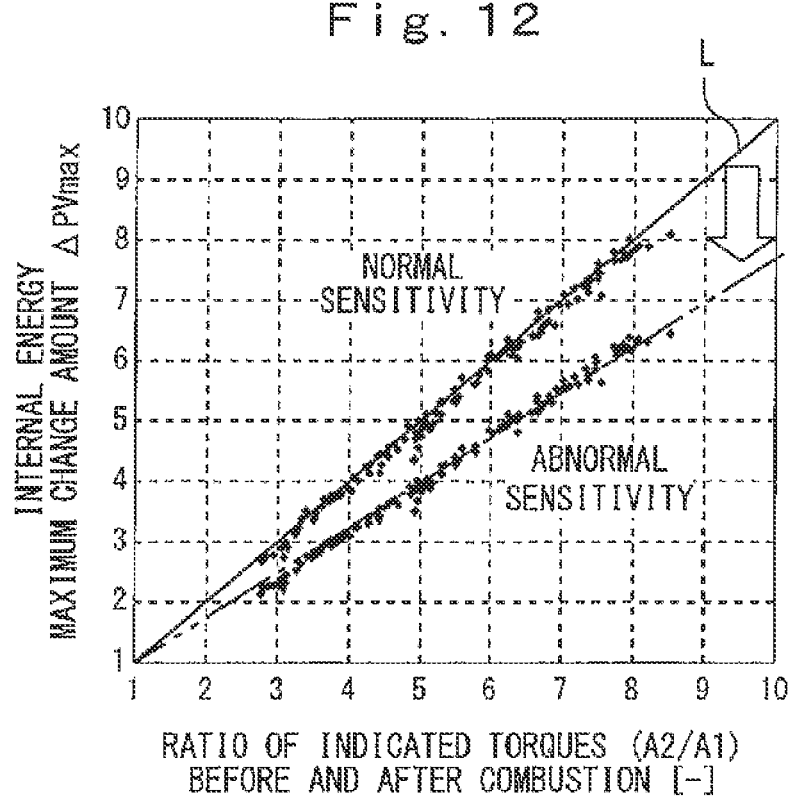
FIG. 12 is a characteristics diagram that shows the relationship between the internal energy maximum change amount ΔPVmax and the indicated torque ratio (A2/A1) according to Embodiment 4 of the present invention.

FIG. 12 is a characteristics diagram that shows the relationship between the internal energy maximum change amount $\Delta$PVmax and the indicated torque ratio (A2/A1) according to Embodiment 4 of the present invention. As shown in FIG. 12, according to the present embodiment, the internal energy maximum change amount $\Delta$PVmax is acquired as a first parameter and the indicated torque ratio (A2/A1) is acquired as a second parameter. As described in the foregoing, the internal energy maximum change amount $\Delta$PVmax has a correlation with the indicated torque, and hence a characteristic line L shown in FIG. 12 can be obtained.

According to the present embodiment, after acquiring the internal energy maximum change amount $\Delta$PVmax and the indicated torque ratio (A2/A1) by the same method as in Embodiments 1 and 3, the determination coefficient $\alpha$ is calculated based on the following equation (8). Subsequently, processing to detect a sensitivity abnormality is performed in a similar manner to Embodiment 1 based on the calculated determination coefficient $\alpha$ and an allowable range (upper limit value $\alpha max$ and lower limit value $\alpha min$) corresponding to the slope of the reference characteristic line L shown in FIG. 12.

$$\alpha = \Delta PV\text{max}/(A2/A1) \quad (8)$$

According to the present embodiment configured in this manner also, the same operational advantages as in the foregoing Embodiment 3 can be obtained. Note that, as specific processing for implementing Embodiment 4, for example, relative to the processing of Embodiment 3 (FIG. 11), step 102 of the processing of Embodiment 1 (FIG. 6) is executed instead of step 210 in FIG. 11. Thereafter, in step 212, it is sufficient to calculate the determination coefficient $\alpha$ based on the above described equation (8).

Embodiment 5

Next, Embodiment 5 of the present invention is described with reference to FIG. 13 to FIG. 15. A feature according to the present embodiment is that parameters used as the first and second parameters are different to those used in the above described Embodiments 1, 3 and 4. In this connection, according to the present embodiment, components that are the same as in Embodiment 1 are denoted by the same reference symbols, and a description of such components is omitted.

[Features of Embodiment 5]

Figure 13:
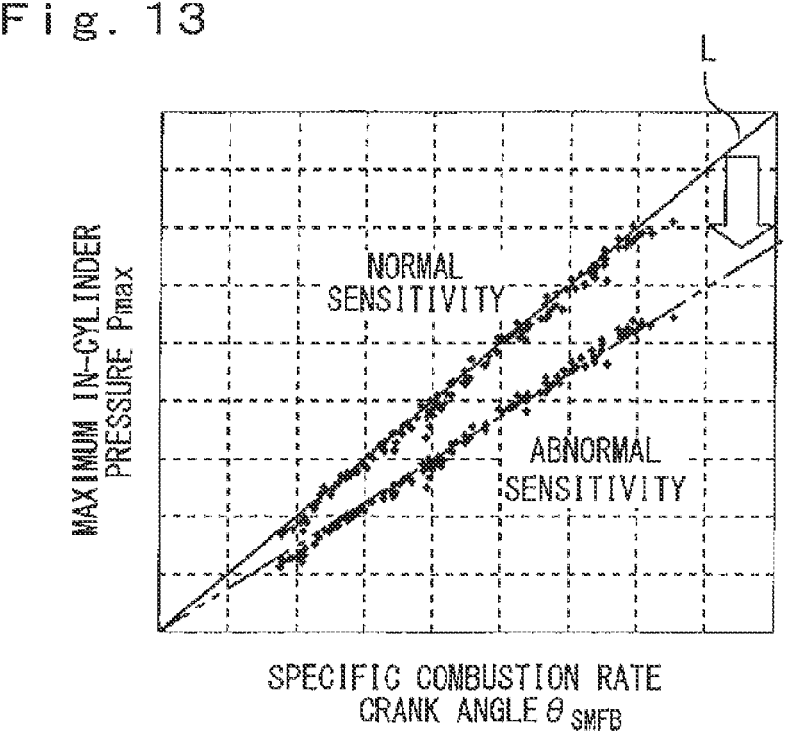
FIG. 13 is a characteristics diagram that shows the relationship between the maximum in-cylinder pressure Pmax and a specific combustion rate crank angle $\theta_{SMFB}$ according to Embodiment 5 of the present invention.

FIG. 13 is a characteristics diagram that shows the relationship between the maximum in-cylinder pressure Pmax and a specific combustion rate crank angle $\theta_{SMFB}$ according to Embodiment 5 of the present invention. As shown in FIG. 13, according to the present embodiment, the maximum in-cylinder pressure Pmax that is a maximum value of the in-cylinder pressure P during a single cycle is acquired as a first parameter. Further, as shown in equation (9) below, a specific combustion rate crank angle $\theta_{SMFB}$ that is a crank angle at which the mass fraction of burned fuel MFB matches a predetermined reference value SMFB is acquired as a second parameter. In this connection, the following equation (9) is derived from the above equation (2).

$$SMFB = \frac{PV^\kappa(\theta_{SMFB}) - PV^\kappa(\theta e)}{PV^\kappa(\theta s) - PV^\kappa(\theta e)} \qquad (9)$$

Thus, according to the present embodiment, two indicators $PV^\kappa$ ($\theta$s) and $PV^\kappa$ ($\theta$e) are calculated based on the in-cylinder pressure P and the like obtained at different crank angles $\theta$s and $\theta$e in the same cycle, and the specific combustion rate crank angle $\theta_{SMFB}$ is acquired based on a ratio between the indicators. More specifically, the reference value SMFB is a ratio between two indicators {$PV^\kappa$ ($\theta$s)−$PV^\kappa$ ($\theta$e)} and {$PV^\kappa$ ($\theta_{SMFB}$)−$PV^\kappa$ ($\theta$e)} that are calculated based on the in-cylinder pressure P and the like at crank angles $\theta$s and $\theta$e, and the specific combustion rate crank angle $\theta_{SMFB}$ is acquired based on the reference value SMFB. In equation (9), the in-cylinder pressure P is included in the denominator and numerator, respectively, and hence the specific combustion rate crank angle $\theta_{SMFB}$ that is acquired based on the reference value SMFB is a parameter that is not affected by the output sensitivity of the in-cylinder pressure sensor.

The reference value SMFB is set to an arbitrary constant value within a range of 0 to 100%, and is previously stored in the ECU 50. FIG. 14 is an explanatory view that shows, for example, a specific combustion rate crank angle $\theta_{50}$ in a case where SMFB=50% in a characteristics diagram of the mass fraction of burned fuel. As shown in FIG. 14, the specific combustion rate crank angle $\theta_{SMFB}$ changes together with the characteristic line of the mass fraction of burned fuel in accordance with the combustion state. However, the relationship shown by the reference characteristic line L in FIG. 13 holds between the specific combustion rate crank angle $\theta_{SMFB}$ and the maximum in-cylinder pressure Pmax. Therefore, processing to detect a sensitivity abnormality is performed similarly to Embodiment 1 based on the determination coefficient α that is the ratio between the two values, and an allowable range (upper limit value αmax and lower limit value αmin) that corresponds to the slope of the reference characteristic line L. According to the present embodiment, the determination coefficient α is calculated by the following equation (10).

$$\alpha = Pmax/\theta_{SMFB} \qquad (10)$$

[Specific Processing to Realize Embodiment 5]

Next, specific processing for implementing the above described control is described with reference to FIG. 15.

Figure 15:
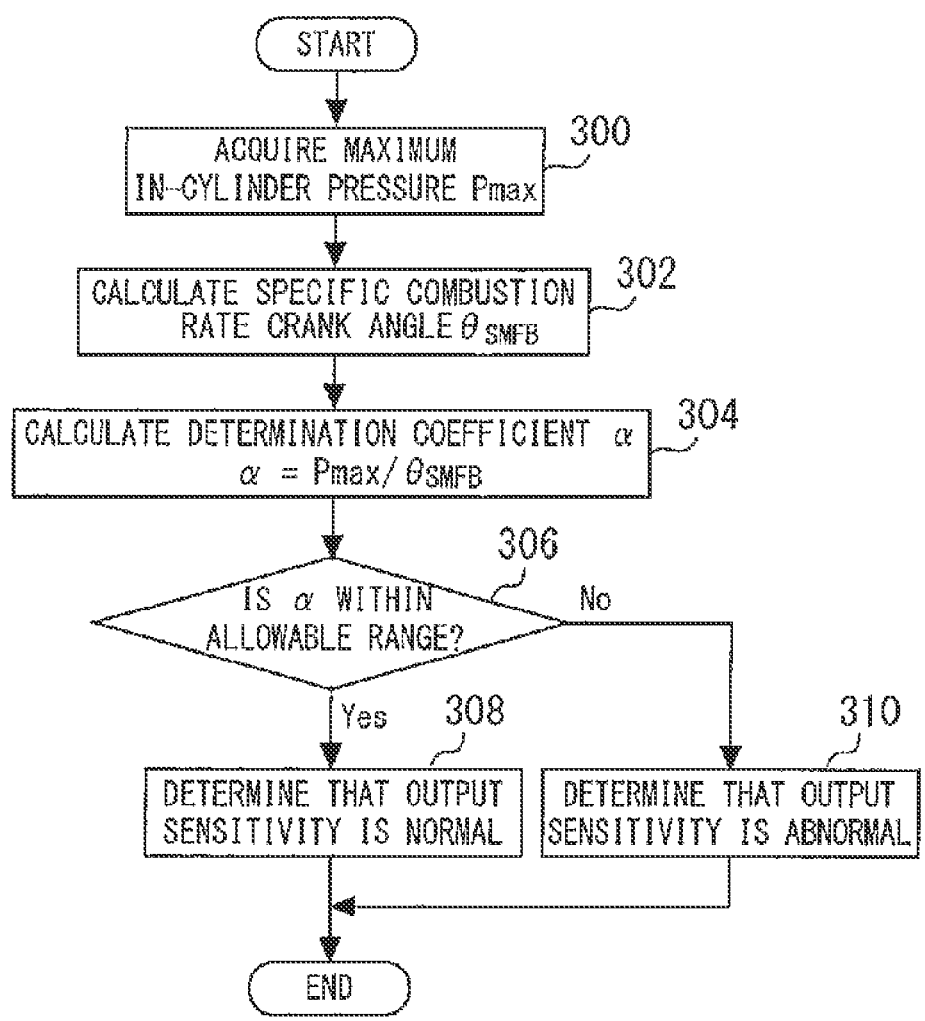
FIG. 15 is a flowchart that illustrates control executed by the ECU according to Embodiment 5 of the present invention.

FIG. 15 is a flowchart that illustrates control executed by the ECU according to Embodiment 5 of the present invention. It is assumed that the routine shown in FIG. 15 is repeatedly executed during operation of the engine. According to the routine shown in FIG. 15, first, in step 300, the ECU 50 acquires the maximum in-cylinder pressure Pmax. Further, in step 302, the ECU 50 acquires the specific combustion rate crank angle $\theta_{SMFB}$ based on the above equation (9).

Next, in step 304, the ECU 50 calculates the determination coefficient α by the above equation (10), and in step 306 determines whether or not the determination coefficient α falls within the allowable range. If the result determined in step 306 is affirmative, that is, if the expression αmax≥α≥αmin holds, in step 308 the ECU 50 determines that the output sensitivity of the in-cylinder pressure sensor is normal. In contrast, if the result determined in step 306 is negative, in step 310 the ECU 50 determines that the output sensitivity is abnormal.

According to present embodiment configured in this manner also, the same operational advantages as in the above described Embodiment 1 can be obtained, and a sensitivity abnormality of the in-cylinder pressure sensor 44 can be detected without depending on the operating condition of the engine. The following advantages can also be obtained according to the present embodiment.

Figure 14:
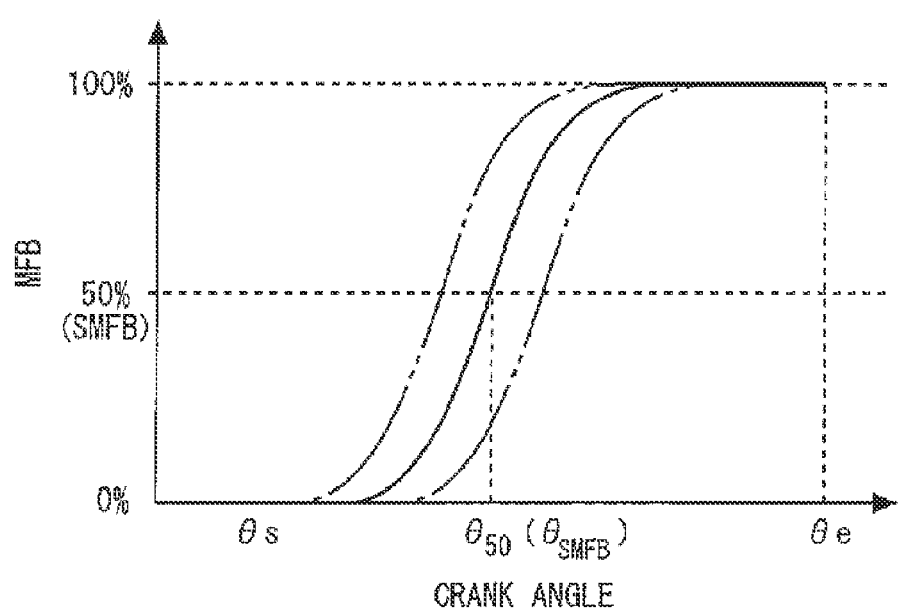
FIG. 14 is an explanatory view that shows, for example, a specific combustion rate crank angle $\theta_{50}$ in a case where SMFB=50% in a characteristics diagram of the mass fraction of burned fuel.

First, as shown in FIG. 14, the mass fraction of burned fuel MFB reaches 100% at a crank angle that is further to the spark advance side than the combustion end crank angle $\theta$e (approximately ATDC 80°). More specifically, at the time of calculating the MFB, the combustion end crank angle $\theta$e used in the above equation (9) can be set to a crank angle (for example, approximately ATDC 60°) that is further to the spark advance side that the actual combustion end point. According to this setting, the specific combustion rate crank angle $\theta_{SMFB}$ can be calculated at a timing that is further to the spark advance side than the actual combustion end point, that is, at a timing before a thermal strain error starts to occur. Further, since the maximum in-cylinder pressure Pmax similarly occurs at a timing that is further to the spark advance side than the actual combustion end point, it is difficult for the maximum in-cylinder pressure Pmax to be affected by a thermal strain error. Thus, according to the present embodiment, similarly to the above described Embodiment 3, the output sensitivity of the in-cylinder pressure sensor can be accurately detected.

Furthermore, according to the present embodiment, based on the specific combustion rate crank angle $\theta_{SMFB}$ at which the mass fraction of burned fuel MFB is a predetermined ratio (reference value SMFB), the determination coefficient α that is the ratio of the maximum in-cylinder pressure Pmax to the crank angle in question is calculated. Therefore, even if the combustion center of gravity is changed by ignition timing control or the like, the determination coefficient α is not affected by such a change. Thus, according to the present embodiment, the same advantages as in the above described Embodiment 2 can be obtained, and a sensitivity abnormality of the in-cylinder pressure sensor can be detected with high accuracy irrespective of a change in the combustion center of gravity.

Note that, in the above described Embodiment 5, step 300 in FIG. 15 shows a specific example of first parameter acquisition means according to claims 1 and 6, and step 302 shows a specific example of second parameter acquisition means. Further, steps 304, 306, 308, and 310 show a specific example of abnormality detection means. Also, the characteristics diagram shown in FIG. 14 and the above equation (9) constitute a specific example of MFB calculation means according to claim 6.

In Embodiments 1 to 5, a configuration is adopted in which the relationship between the first parameter and the second parameter is calculated as the determination coefficient α, and abnormality detection is performed based on the determination coefficient α. However, the present invention is not limited thereto, and for example, a configuration may be adopted in which the relationship between the first parameter and the second parameter is stored in advance as a data map that changes according to the operating conditions or the like, and abnormality detection is performed based on the data map. Thus, even when there is a correlation other than a proportionality relationship between the first parameter and the second parameter, abnormality detection can be executed based on the relationship between the two parameters.

DESCRIPTION OF REFERENCE NUMERALS

10 engine (internal combustion engine), 12 piston, 14 combustion chamber, 16 crankshaft, 18 intake passage, 20 exhaust passage, 22 throttle valve, 24 catalyst, 26 fuel injection valve, 28 spark plug, 30 intake valve, 32 exhaust valve, 40 crank angle sensor, 42 airflow sensor, 44 in-cylinder pressure sensor, 50 ECU, $PV^\kappa$ heat release quantity (first parameter), A2/A1 indicated torque ratio (second parameter), A1,A2 indicated torque (indicator), α determination coefficient (relationship between first and second parameters), αmax, αmin upper limit value, lower limit value of allowable range (criterion for determining), ΔPVmax internal energy maximum change amount (first parameter, indicator), ΔPVmax/PV0 internal energy ratio (second parameter), PV0 reference internal energy (indicator), Pmax maximum in-cylinder pressure (first parameter), $\theta_{SMFB}$ specific combustion rate crank angle (second parameters), SMFB reference value, θs combustion start crank angle, θe combustion end crank angle

The invention claimed is:

1. A control apparatus for an internal combustion engine, comprising:
   an in-cylinder pressure sensor configured to output a signal corresponding to an in-cylinder pressure of the internal combustion engine; and
   an electronic control unit programmed to;
   acquire a first parameter which is acquired based on the output of the in-cylinder pressure sensor and which is affected by an output sensitivity of the sensor;
   acquire a second parameter which has a correlation with the first parameter and which is not affected by the output sensitivity, and calculate two indicators based on in-cylinder pressures obtained at different crank angles in an identical cycle and calculate the second parameter based on a ratio between the indicators;
   determine whether or not an abnormality of the output sensitivity of the in-cylinder pressure sensor exists based on a relationship between the first parameter and the second parameter; and
   control at least one of a throttle valve, a fuel injection valve, or a spark plug based upon a result of the abnormality determination.

2. The control apparatus for an internal combustion engine according to claim 1, where the electronic control unit is further programmed to:
   by integrating multiplication values obtained by multiplying an amount of change in an in-cylinder volume per unit crank angle by an in-cylinder pressure in a predetermined crank angle range, calculate an indicated torque corresponding to the crank angle range;
   wherein:
   a heat release quantity $PV^\kappa$ that is calculated based on an in-cylinder pressure, an in-cylinder volume, and a ratio of specific heat is the first parameter; and
   a ratio between an indicated torque A1 that is calculated in a crank angle range corresponding to a compression stroke and an indicated torque A2 that is calculated in a crank angle range corresponding to an expansion stroke is the second parameter.

3. The control apparatus for an internal combustion engine according to claim 2, wherein the electronic control unit is further programmed to:
   set a determination criterion that a relationship between the first parameter and the second parameter should satisfy when the output sensitivity of the in-cylinder pressure sensor is normal; and
   correct the determination criterion based on a deviation between a combustion center of gravity calculated in a cycle in which abnormality detection of the output sensitivity is performed and a reference combustion center of gravity that is previously set.

4. The control apparatus for an internal combustion engine according to claim 1, wherein the electronic control unit is further programmed to:
   calculate a PV value by multiplying an in-cylinder pressure at an arbitrary crank angle by an in-cylinder volume at the crank angle, and acquire a maximum value of the PV value during one cycle as a maximum internal energy PVmax; and
   acquire a crank angle that is symmetrical about a top dead center position with a crank angle at which the maximum internal energy PVmax is obtained, and calculate the PV value at the crank angle as a reference internal energy PV0;
   wherein:
   an internal energy maximum change amount ΔPVmax that is obtained by subtracting the reference internal energy PV0 from the maximum internal energy PVmax is the first parameter; and
   a ratio (ΔPVmax/PV0) between the internal energy maximum change amount ΔPVmax and the reference internal energy PV0 is the second parameter.

5. The control apparatus for an internal combustion engine according to claim 1, wherein the electronic control unit is further programmed to:
   by integrating multiplication values obtained by multiplying an amount of change in an in-cylinder volume per unit crank angle by an in-cylinder pressure in a predetermined crank angle range, calculate an indicated torque corresponding to the crank angle range;
   calculate a PV value by multiplying an in-cylinder pressure at an arbitrary crank angle by an in-cylinder volume at the crank angle, and acquire a maximum value of the PV value during one cycle as a maximum internal energy PVmax; and
   acquire a crank angle that is symmetrical about a top dead center position with a crank angle at which the maximum internal energy PVmax is obtained, and calculate the PV value at the crank angle as a reference internal energy PV0;

wherein:
an internal energy maximum change amount ΔPVmax that is obtained by subtracting the reference internal energy PV0 from the maximum internal energy PVmax is the first parameter; and
a ratio (A2/A1) between an indicated torque A1 that is calculated in a crank angle range corresponding to a compression stroke and an indicated torque A2 that is calculated in a crank angle range corresponding to an expansion stroke is the second parameter.

6. The control apparatus for an internal combustion engine according to claim 1, wherein the electronic control unit is further programmed to:
calculate, a heat release quantity $PV^\kappa$ based on an in-cylinder pressure, an in-cylinder volume, and a ratio of specific heat, and calculate a mass fraction of burned fuel at an arbitrary crank angle based on a ratio between a heat release quantity $PV^\kappa$ (θs) at a combustion start crank angle θs and a heat release quantity $PV^\kappa$ (θe) at a combustion end crank angle θe;
wherein:
a maximum in-cylinder pressure Pmax during one cycle is the first parameter; and
a crank angle $\theta_{SMFB}$ at which the mass fraction of burned fuel matches a predetermined reference value SMFB is the second parameter.

\* \* \* \* \*